Figure 3:
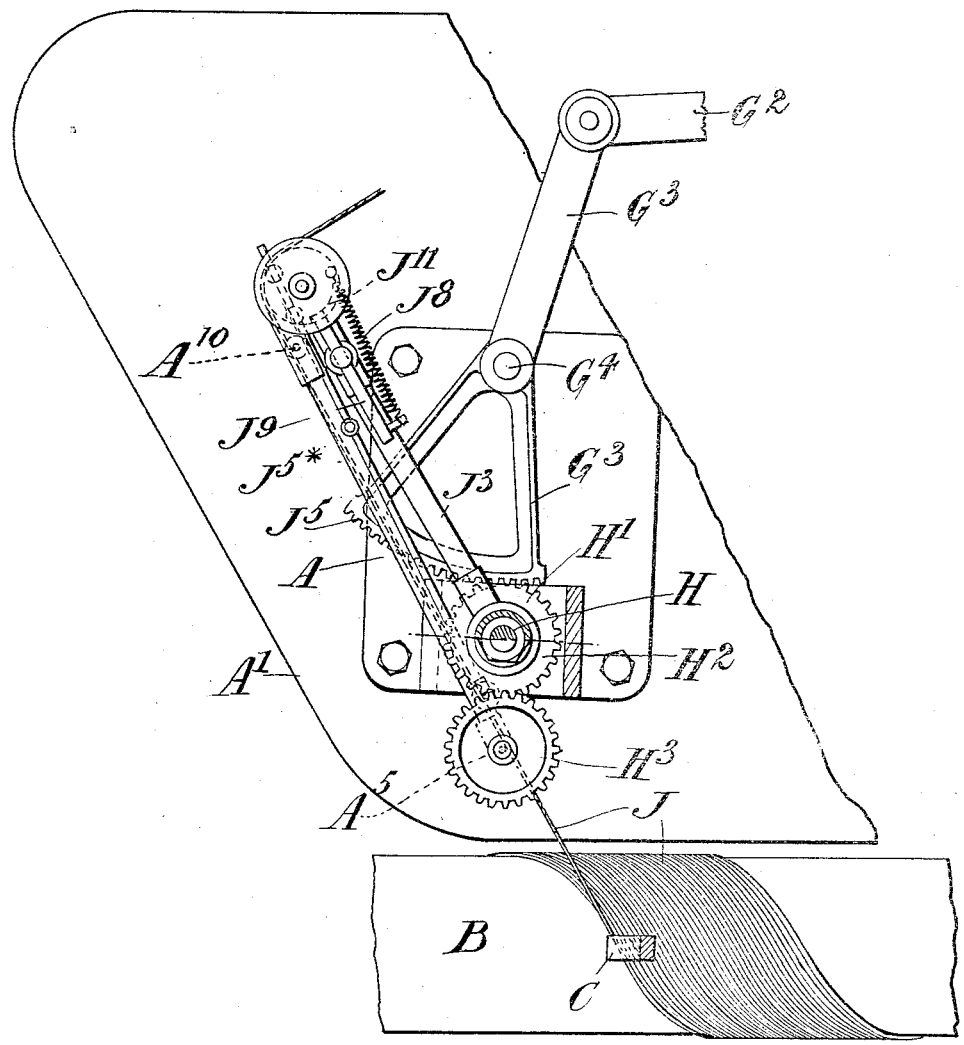

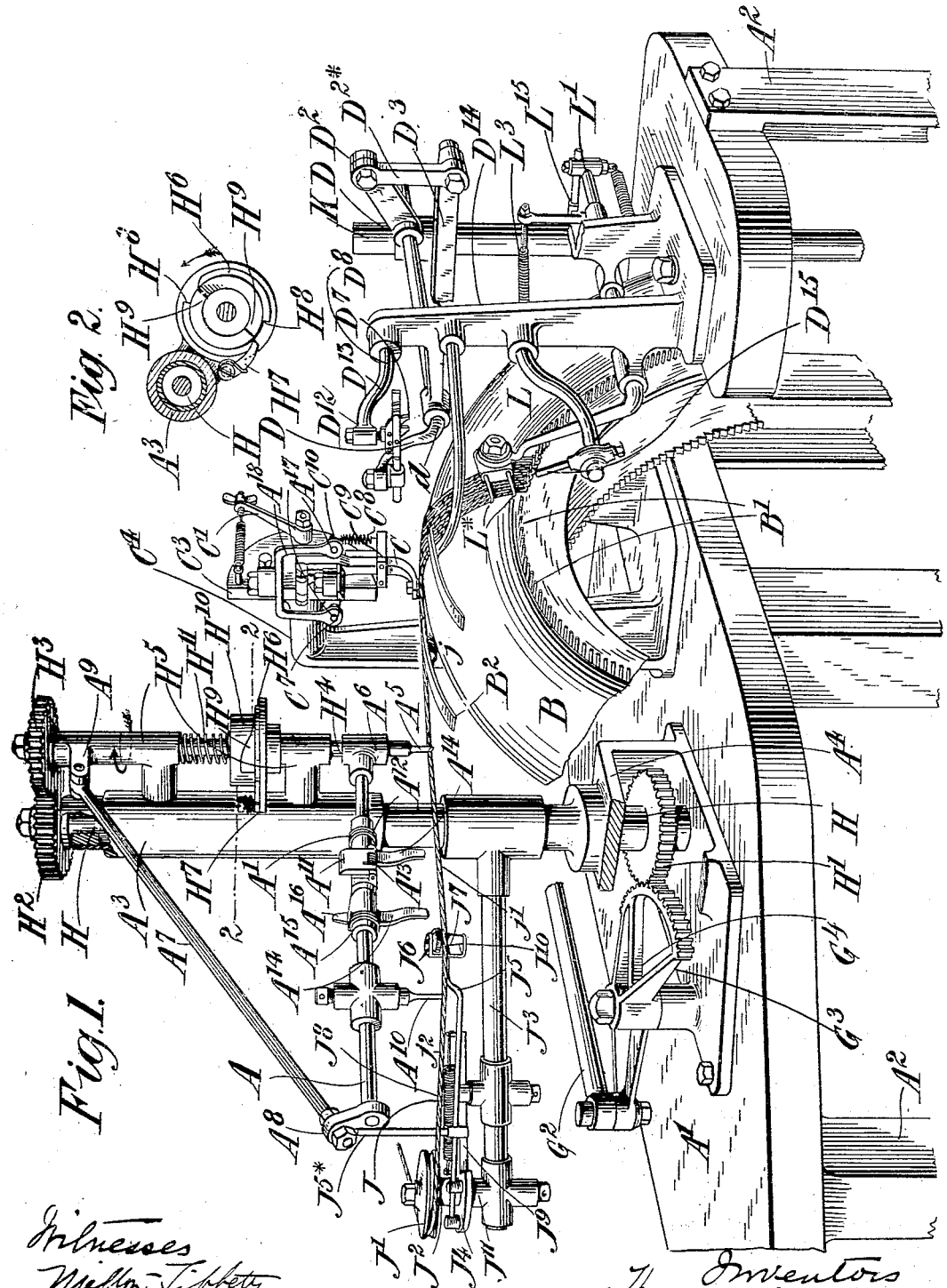

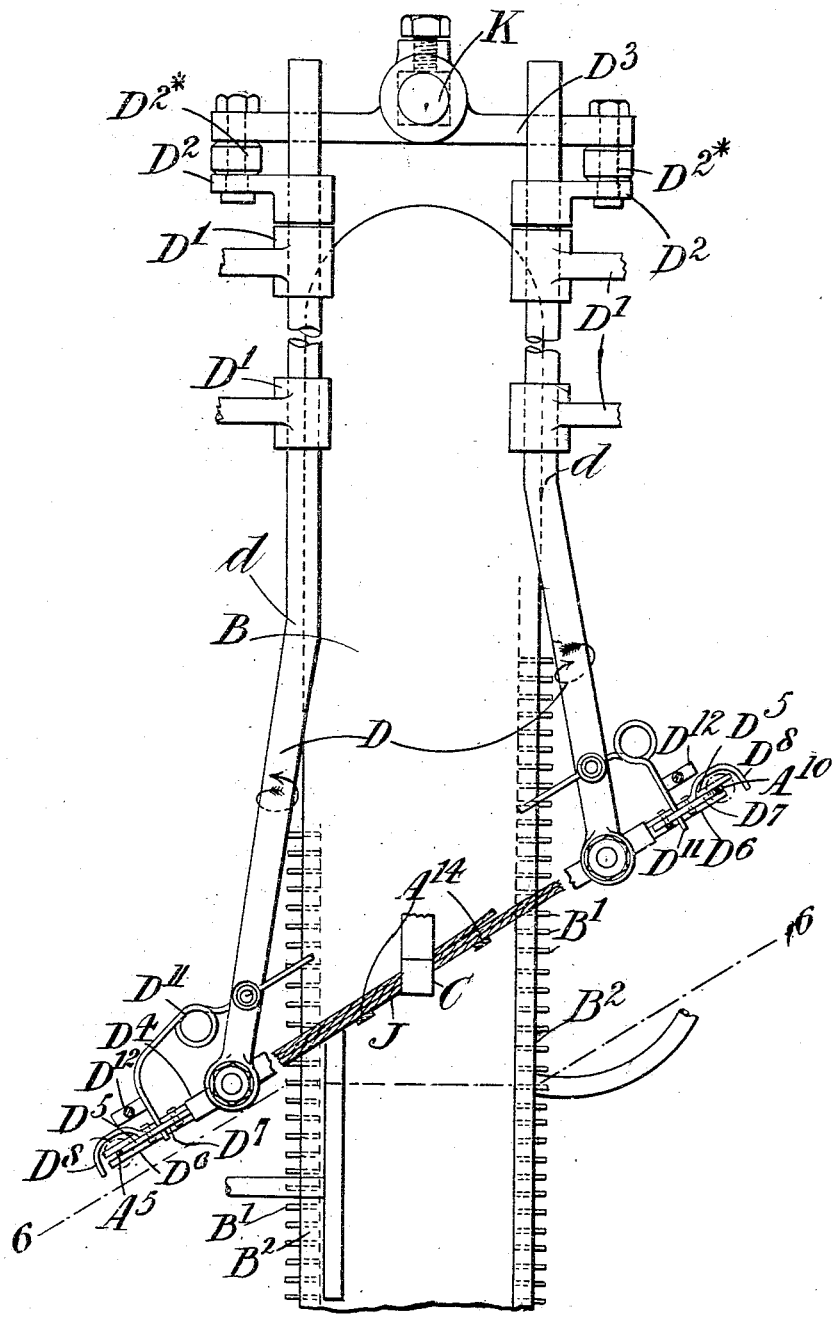

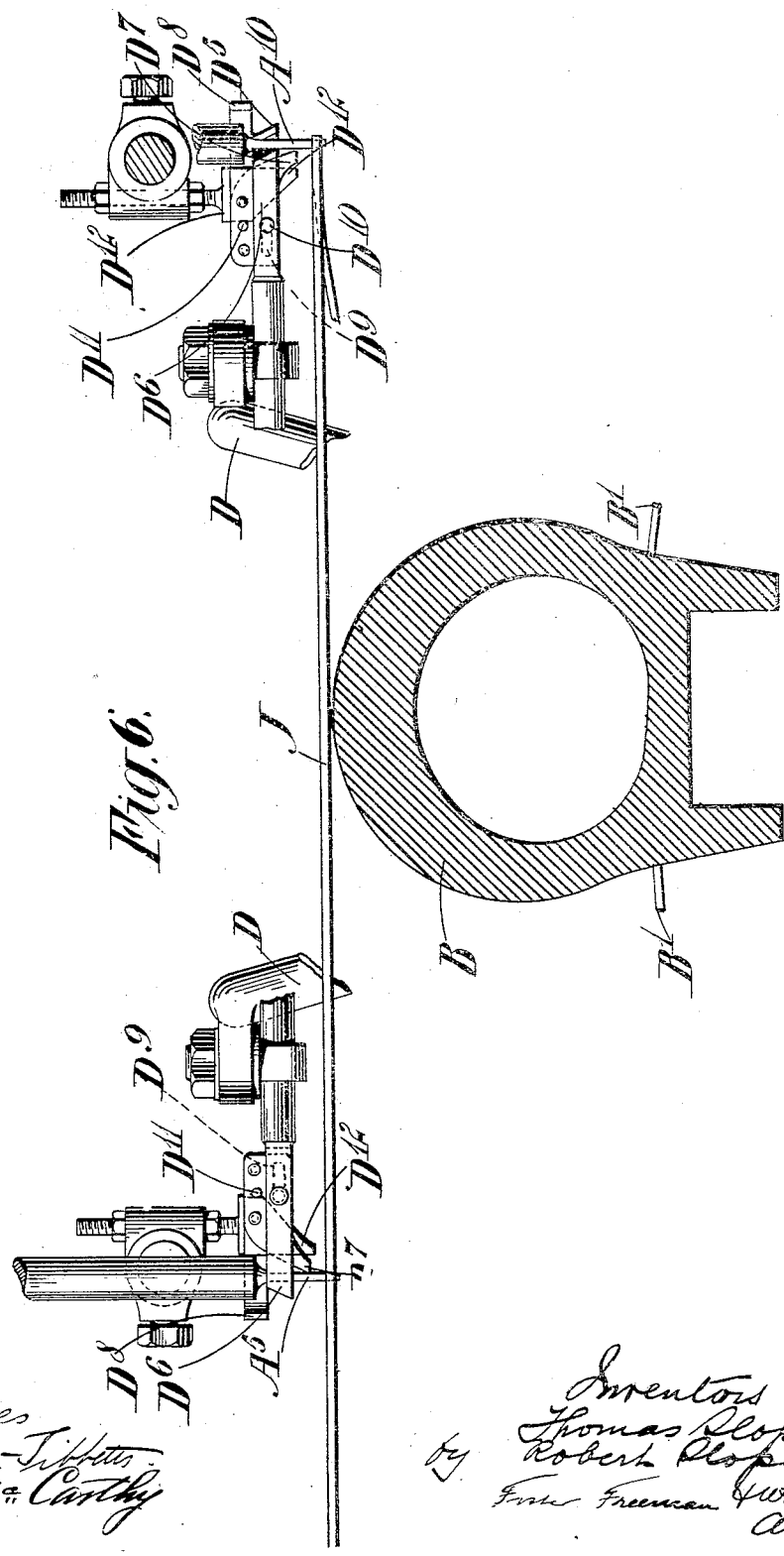

No. 852,855. PATENTED MAY 7, 1907.
T. & R. SLOPER.
MACHINERY FOR USE IN THE MANUFACTURE OF PNEUMATIC TIRES.
APPLICATION FILED AUG. 20, 1906.
15 SHEETS—SHEET 6.
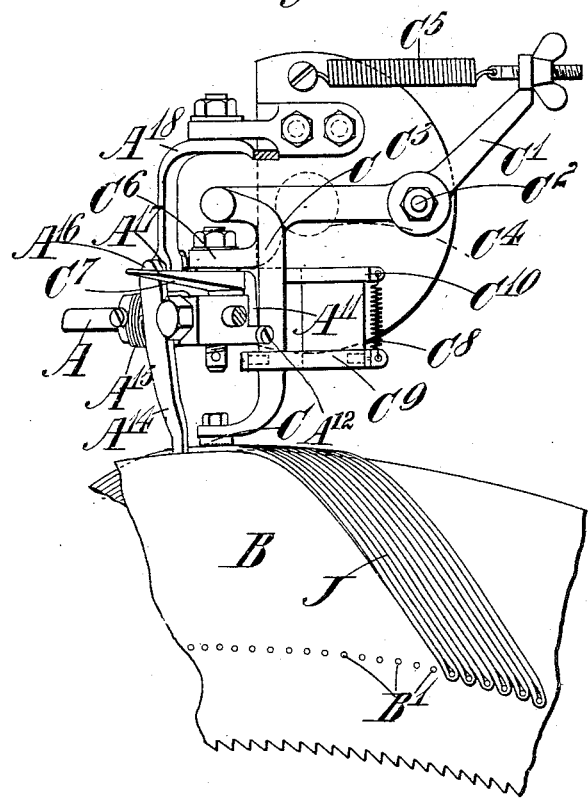
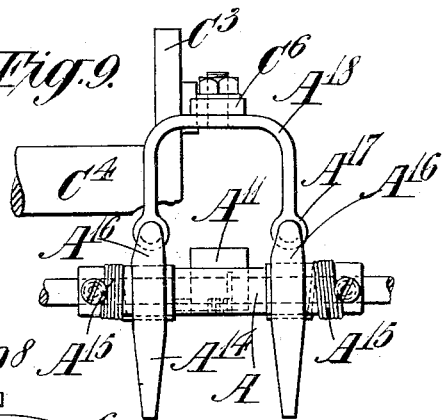
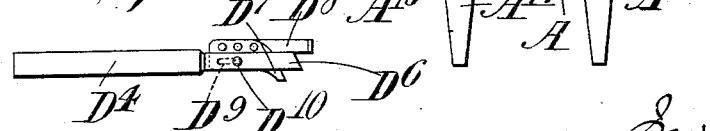

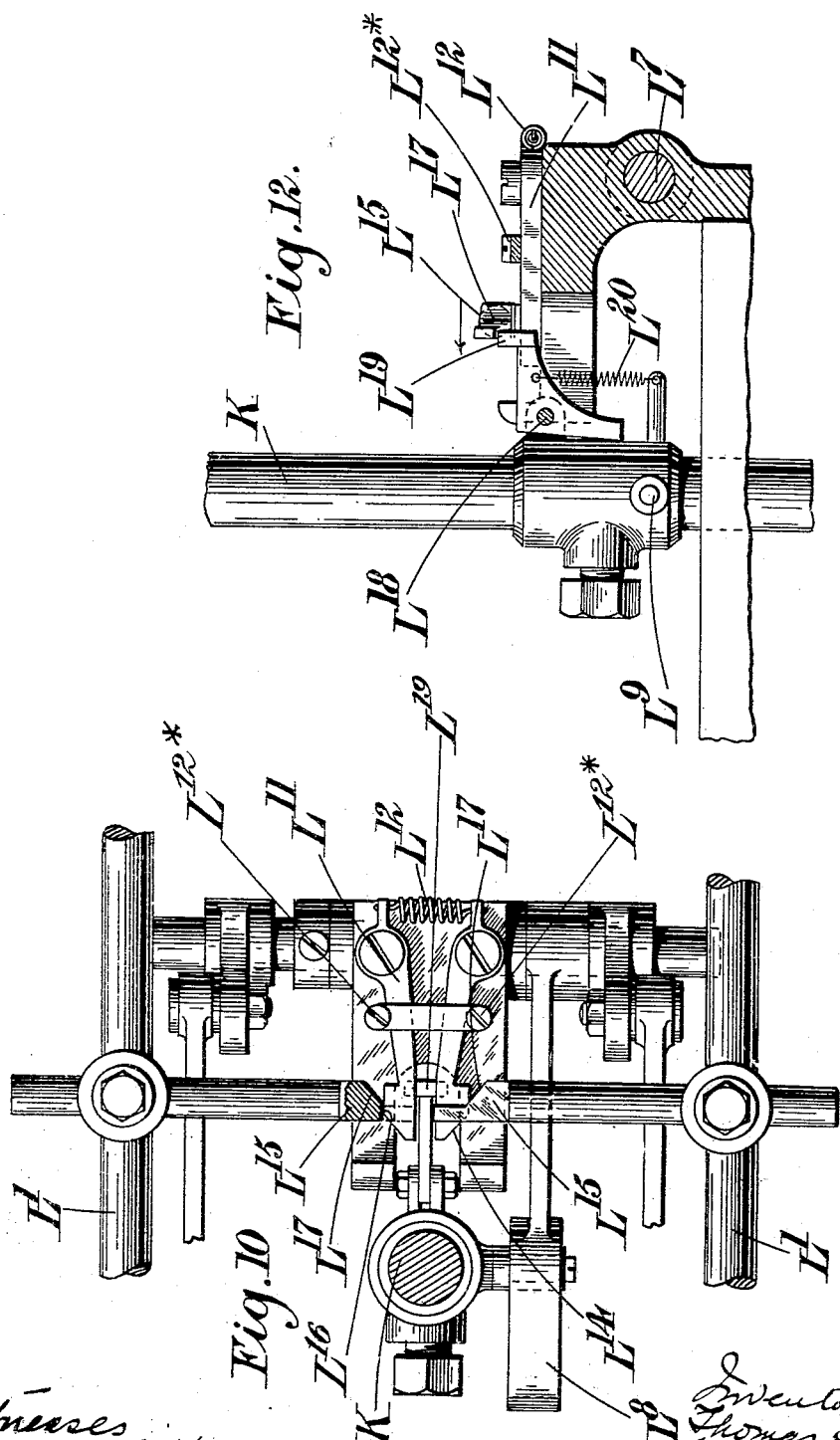

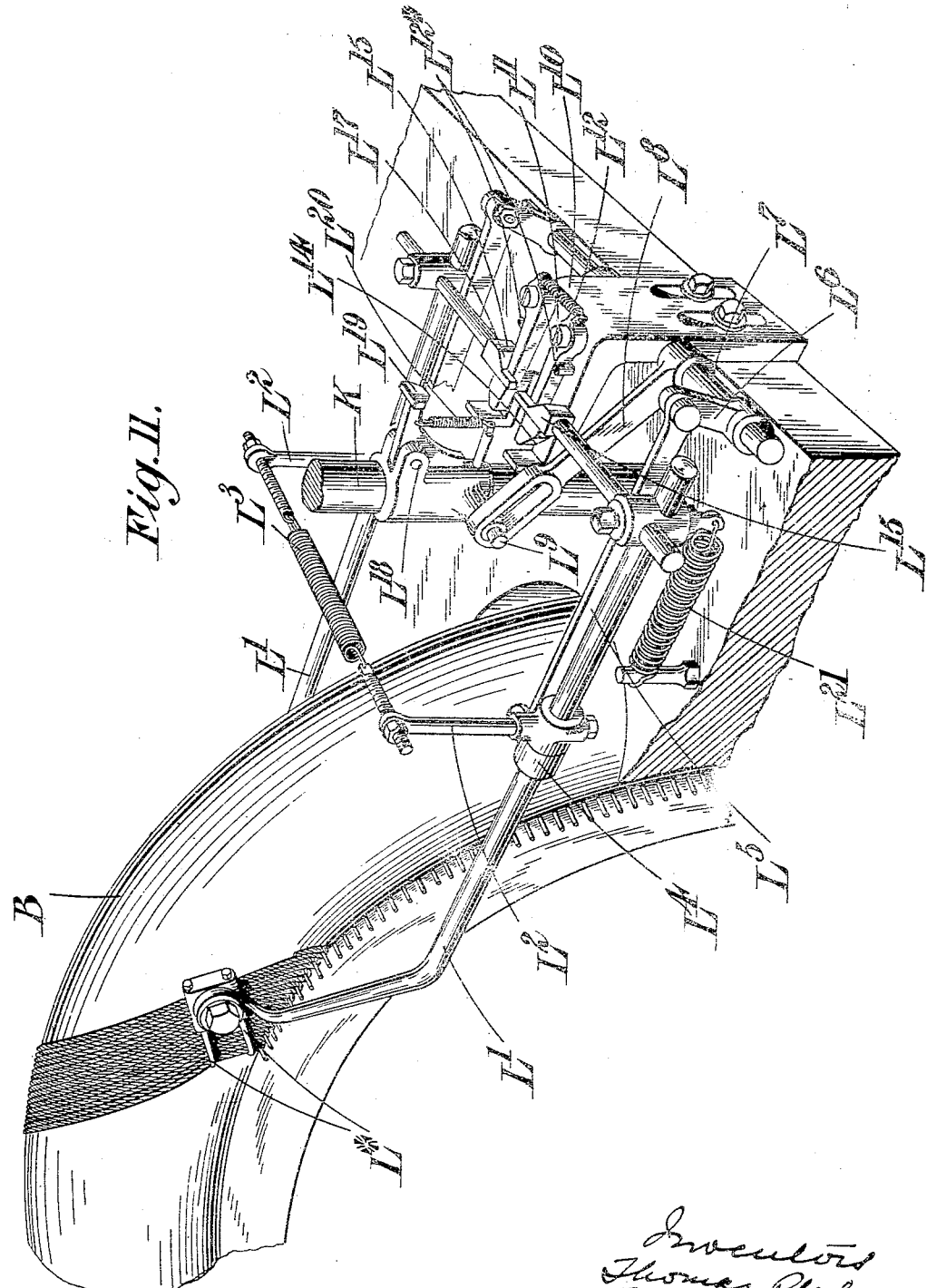

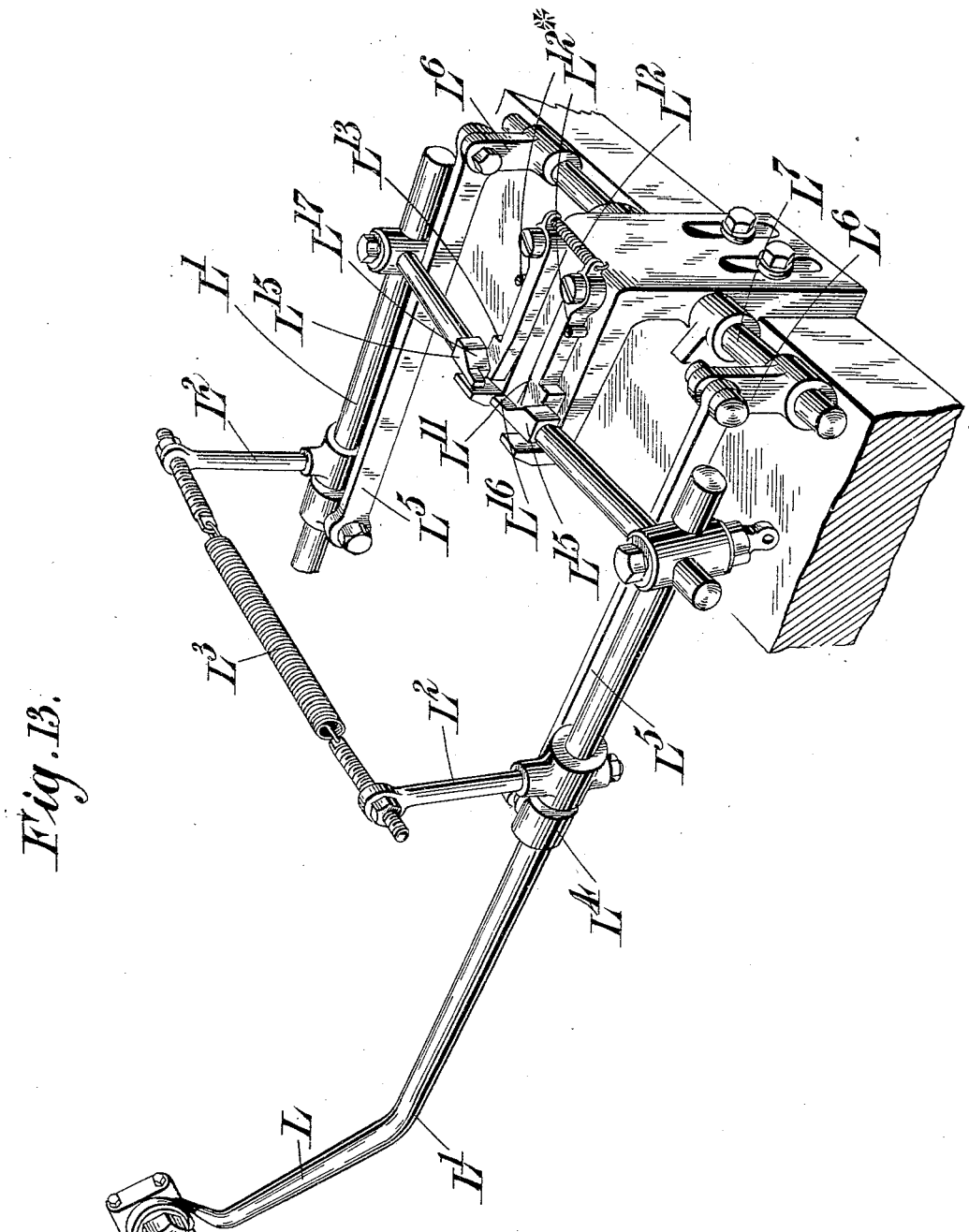

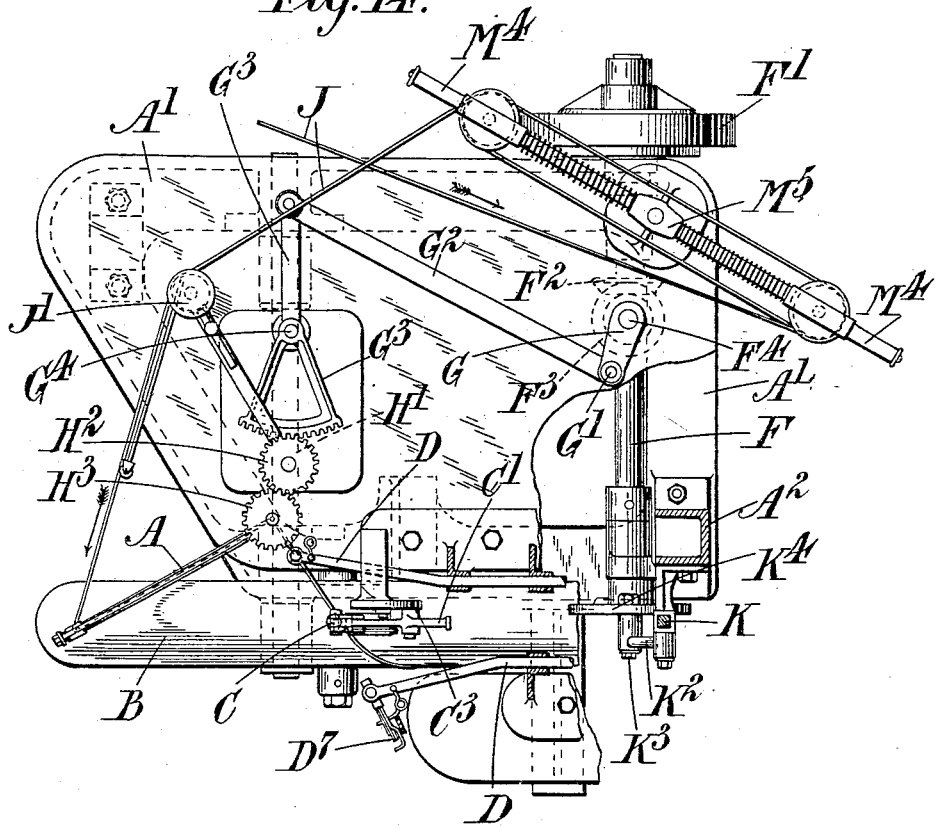

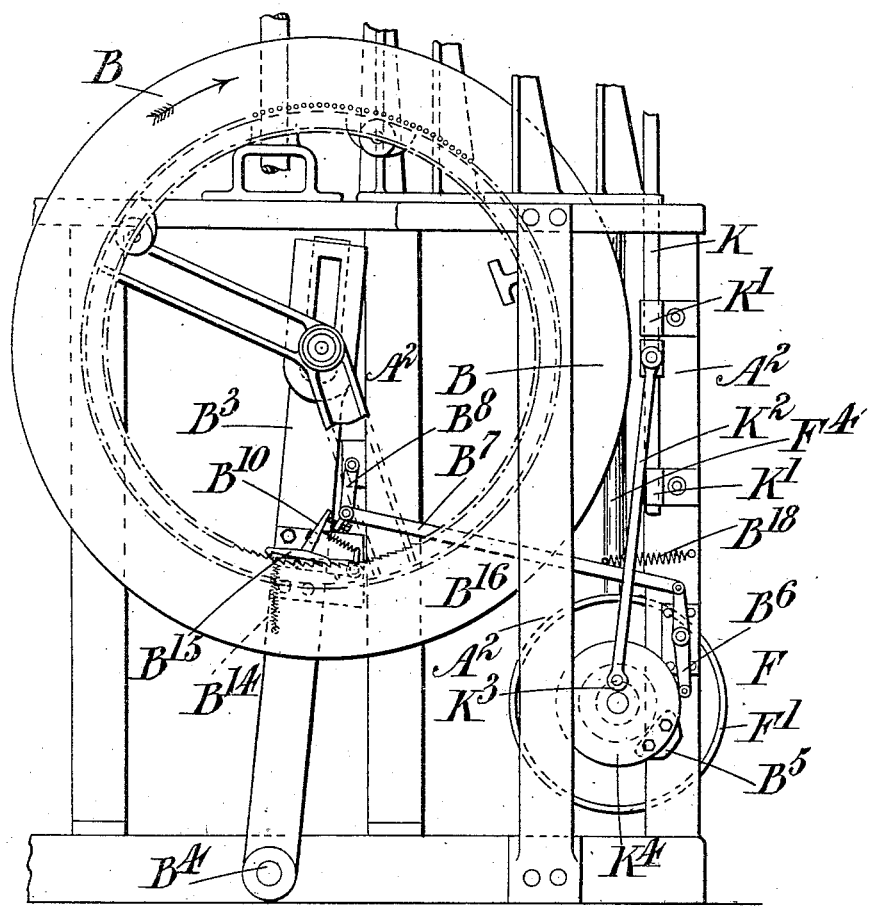

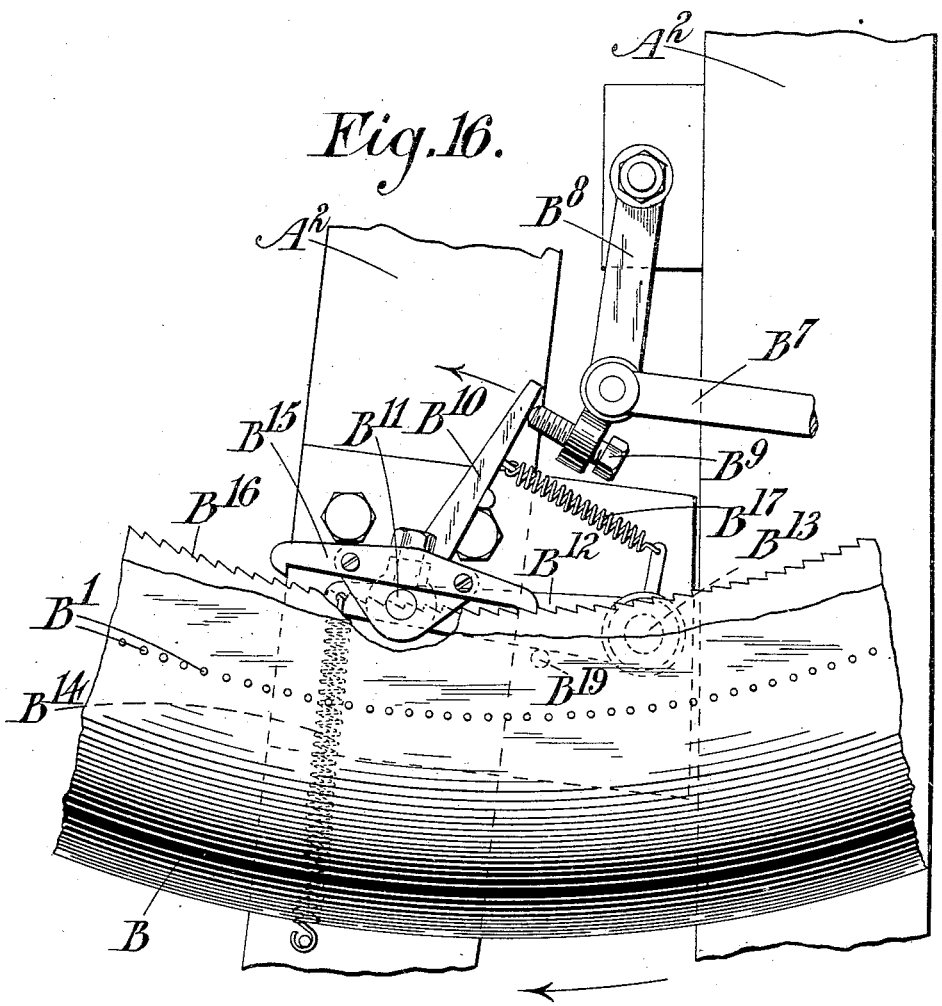

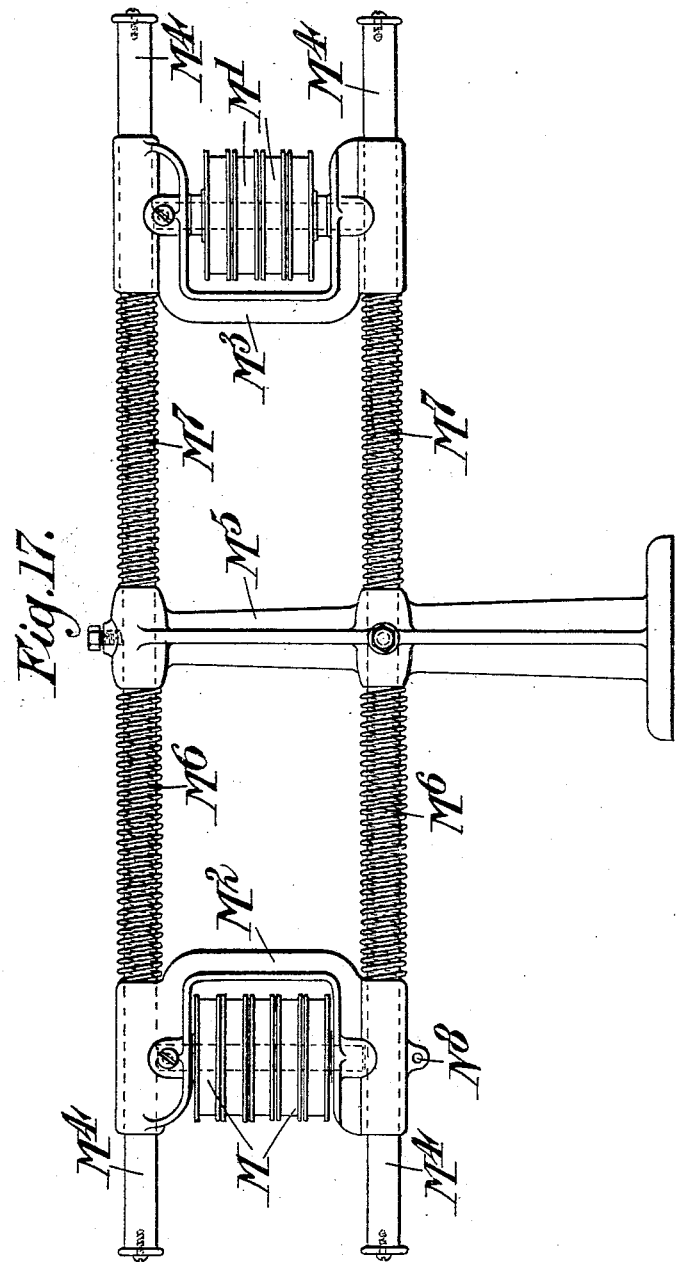

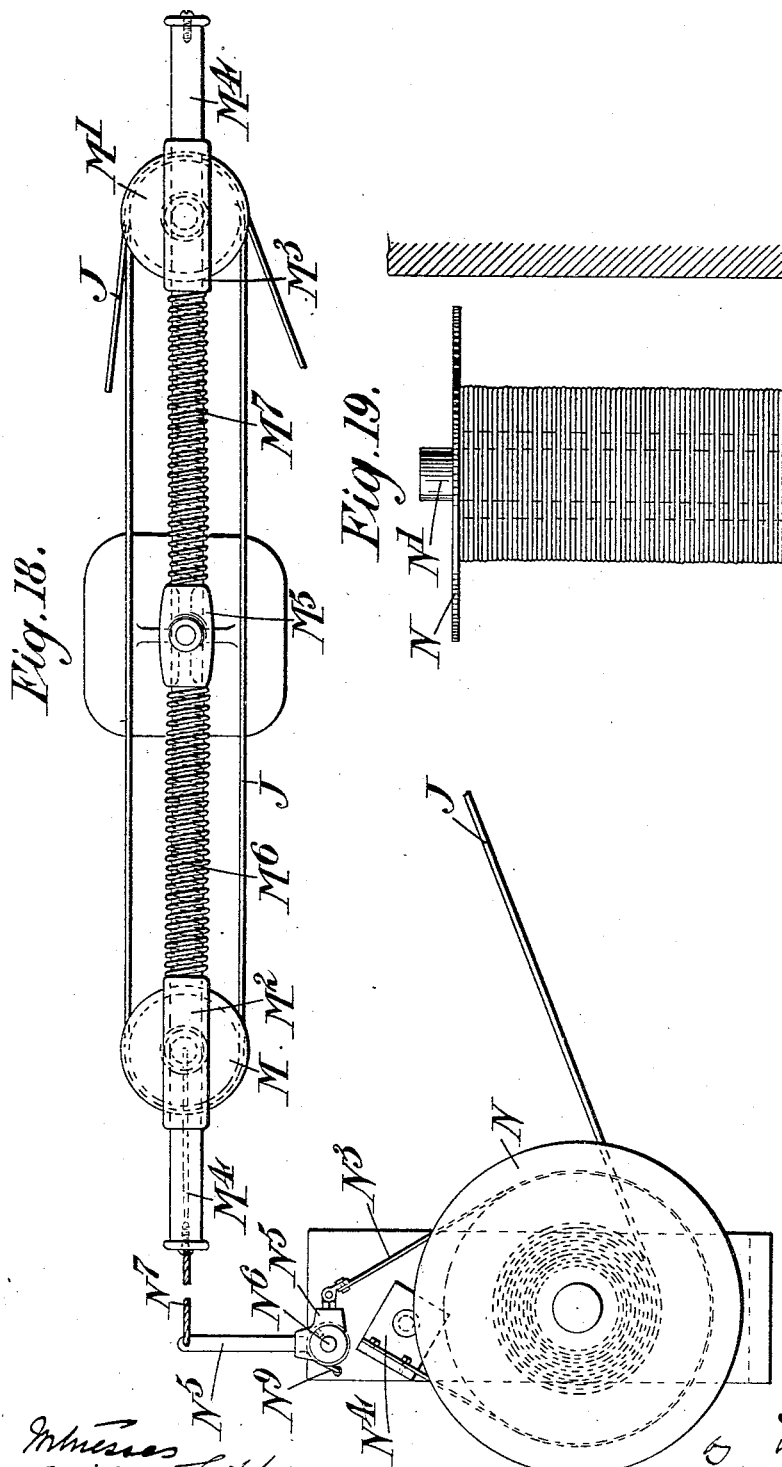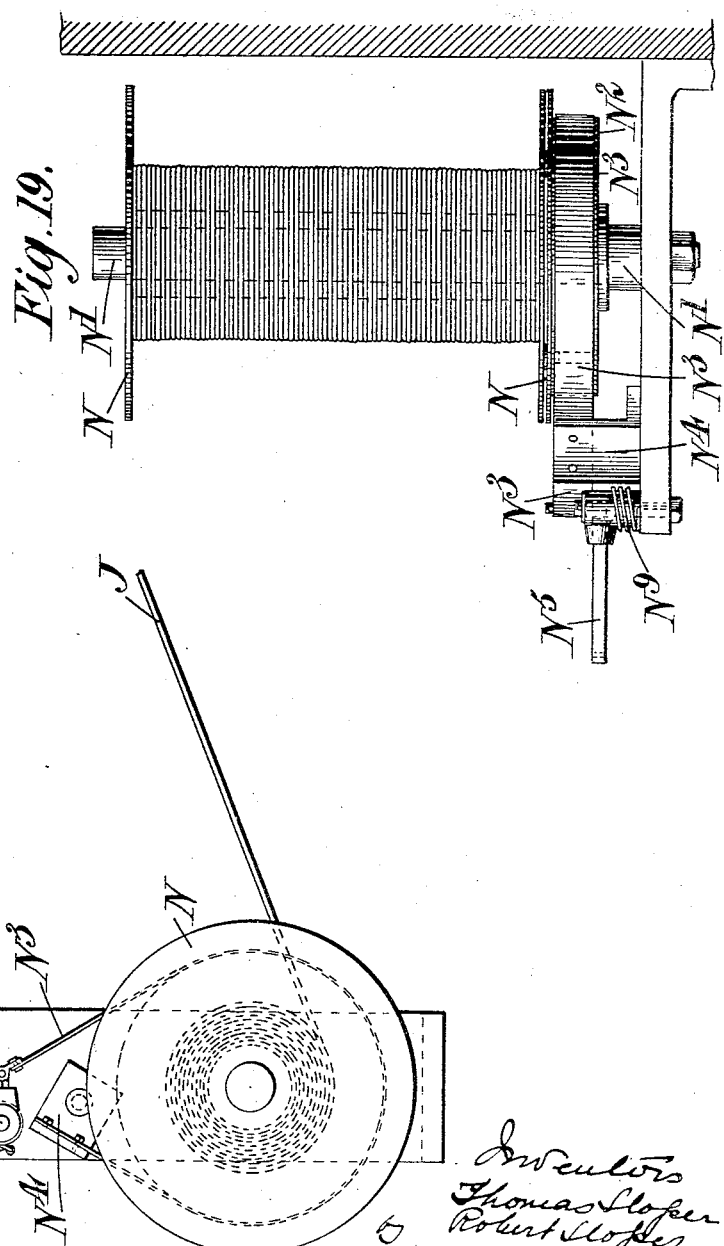

UNITED STATES PATENT OFFICE.

THOMAS SLOPER AND ROBERT SLOPER, OF DEVIZES, ENGLAND.

MACHINERY FOR USE IN THE MANUFACTURE OF PNEUMATIC TIRES.

No. 852,855.

Specification of Letters Patent.

Patented May 7, 1907.

Application filed August 20, 1906. Serial No. 331,415.

*To all whom it may concern:*

Be it known that we, THOMAS SLOPER and ROBERT SLOPER, subjects of the King of England, residing at Devizes, in the county of Wilts, England, have invented certain new and useful Improvements in Machinery for Use in the Manufacture of Pneumatic Tires, of which the following is a specification.

Our invention relates to improvements in machinery for use in the manufacture of pneumatic tires and has for its object to provide a machine for the purpose of building a tire fabric of cords wound backward and forward across the tire. The cords employed are preferably rubbered cords such as described in British Letters Patent No. 18135, dated 18th August 1902, and granted to C. H. Gray and T. Sloper jointly.

In carrying out our invention we employ a "former" or mold upon which the fabric is built up. The "former" may be of any suitable construction but is preferably collapsible and provided with a row of pins on each side as described in the British Letters Patent No. 10942 dated 13th May 1903 and U. S. Patent 781,687 dated February 7, 1905 also granted to C. H. Gray and T. Sloper.

We employ a lever or arm to "fold" the cord into loops and to place these loops across the former at an angle to correspond with the angle at which the cords are to be laid in the finished tire. This lever or arm which may be referred to as the folding arm carries two pins or projections. One of these pins is situated at the pivot of the folding arm and it may revolve upon its axis about a half revolution but does not alter its position. This pin for the purpose of distinction may be designated the fixed pin. The other or moving pin is at or near the end of the folding arm and is carried with it in its movement through about one half of a revolution and back again. The cord is led from the supply spool to a tension regulator and from this to a pulley or guide from which it passes to the "former" being folded and guided in its course by the folding arm. The latter delivers the cord to the "former" in the shape of two loops one on each side, each loop being held out straight by the above mentioned pins on the folding arm. Two transferring arms now come into operation and transfer the loops from the pins of the folding arm to one of the pins of the "former" on each side at the same time laying the cord at its proper angle and curve on the "former."

The folding arm then returns through a half revolution, takes up another length of cord, folds it into loops and the operation is repeated until the whole circumference of the slowly revolving former is covered. Guides or presser feet are employed where requisite to cause the cord to take and retain its proper position.

Any suitable mechanism may be employed on the transferring arms for holding the cord loops, but we prefer to employ spring operated tumblers having limited movement. These tumblers take the places previously occupied by the pins when the loops are removed from the folding arm, and in their turn give up these places to the pins on the "former" when the transferring arms are approaching the end of their movement.

After the loop of the cord on each side of the "former" is placed on its proper pin a presser-foot or placer may be used to consolidate the fabric and hold the loop out of the way while the next loop is placed on its pin.

The folding arm may be caused to move upward slightly on its return movement to enable the pins thereon to clear the cord.

When employing a cord of flattened cross section and applying it in the manner described in the British Letters Patent No. 753, dated 12th January 1903 and granted to C. H. Gray and T. Sloper the cord is folded by the folding arm in such a manner that the flat sides are together. Guides may be employed at or near the tread portion of the "former" to turn the cord partly round so that it makes a full fabric at the tread. The great advantage of employing a flattened cord is that it folds more easily and further occupies less room at the smaller circumference of the tire so that more cord can be used and a stronger fabric produced than if unflattened cord were employed.

From the above description it will be understood that although there is no backward movement of the cord the folding arm takes its supply of cord intermittently, and as it is very desirable that the cord should always be under tension and that this tension should be as uniform as possible we employ the tension regulator between the supply spool and the folding arm. This may consist of pulleys kept apart by springs.

We prefer to employ two springs on the tension regulator one stronger than the other, and we prefer to so arrange that the weaker spring always keeps a tension on the cord.

In connection with the supply spool we employ a band or other brake and so arranged that unless or until the stronger spring of the tension regulator is in use this brake is operative but as this spring comes into use it gradually releases the brake. The effect of this combination is that if the machine should slow down or the supply spool should tend to overrun, the stronger spring of the tension regulator gradually and partially applies the brake to the supply spool, and if the machine stops fully applies it so that a tension is always maintained on the cord by the weaker spring, or springs of the tension regulator.

Figure 4:
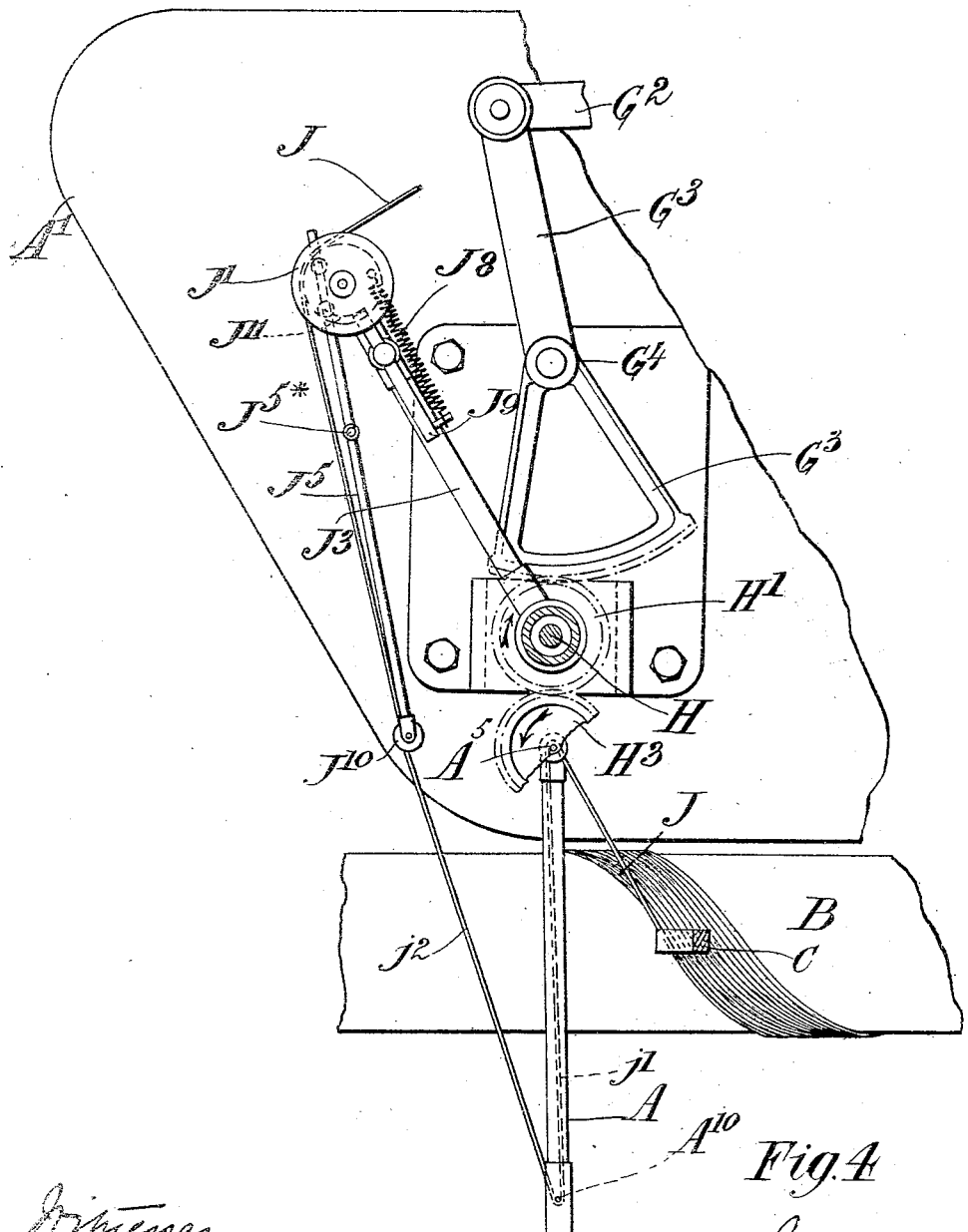
Figure 20:
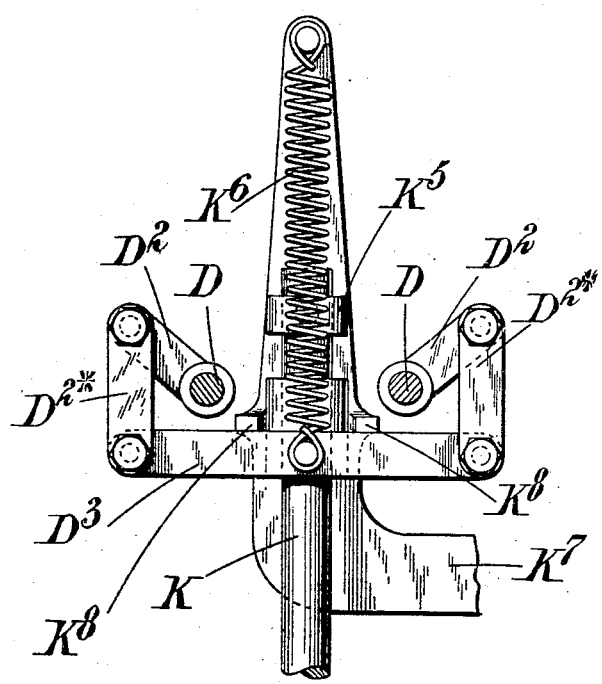

In the accompanying drawings which illustrate one method of carrying out this invention:—Figure 1 is a perspective view of the upper portion of the machine, with some parts omitted for the sake of clearness; Fig. 2 is a horizontal section of a detail of the same on the line 2—2 of Fig. 1; Figs. 3 and 4 are diagrammatic plans of the folding arm in two different positions; Fig. 5 is a plan showing the transferring arms; Fig. 6 is a vertical section of the apparatus shown in Fig. 5 on the line 6—6 of that figure; Fig. 7 is an elevation of one of the transferring fingers; Fig. 8 is a side elevation of the presser-foot mechanism; Fig. 9 is a front elevation of a detail co-operating therewith; Fig. 10 is a plan of the displacing arm mechanism; Fig. 11 is a perspective view of the same with the parts in a different position; Fig. 12 is a side elevation of a portion of this mechanism. Fig. 13 is a perspective view showing the same mechanism in yet another position; Fig. 14 is a plan of the whole machine with parts broken away for the sake of clearness; Fig. 15 is an elevation of the lower portion of the machine; Fig. 16 is an elevation of a detail shown in Fig. 15 but on an enlarged scale; Fig. 17 is an elevation of the tension device; Fig. 18 is a plan of the same with the co-operating cord-carrying spool; Fig. 19 is an elevation of the cord-carrying spool, and Fig. 20 is an elevation of a detail.

Like letters indicate like parts throughout the drawings.

This invention comprises five main co-operating devices, all of which appear in Fig. 1. The first of these is the folding arm A by which the cord is made into loops and presented to the "former" B, constituting another main element and whereon the fabric is built up. When the looped cord is presented to the "former" it is first temporarily gripped by the presser foot C and then the ends of the loop are removed from the folding arm by transferring devices D. The presser foot and transferring devices constitute two more of the main elements referred to and the last of these elements is the consolidating presser-foot or displacing arm L, one of which is employed on each side of the "former" for the purpose of drawing back that cord previously laid upon the "former" while the next cord is placed in position.

The mechanism shown in Fig. 1 is carried upon a table $A^1$ having supports $A^2$ and beneath the table and mounted upon the supports is the driving shaft F (Figs. 14 and 15) from which the whole mechanism receives motion. The shaft carries a pulley $F^1$ adapted to receive a driving belt and the pulley may be provided with any suitable clutch mechanism whereby it may be made fast or loose on the shaft as required. Fast on the shaft F is a beveled wheel $F^2$ which meshes with a wheel $F^3$ fast on a vertical shaft $F^4$. The shaft $F^4$ is carried in suitable bearings upon the frame of the machine and has at its upper end above the table $A^1$, an arm G carrying a crank-pin $G^1$. Pivoted to the crank-pin is a link $G^2$ whose free end is pivoted to a toothed quadrant member $G^3$. This member is pivoted to the table $A^1$ at $G^4$ and the teeth of the quadrant engage a wheel $H^1$ fast on a vertical shaft H. This shaft is carried and finds its bearings in a tubular vertical member $A^3$ rigidly secured to a bracket $A^4$ on the table $A^1$. At the upper end of the shaft H is secured a wheel $H^2$ which meshes with a wheel $H^3$ fast on the upper end of a spindle $H^4$. This spindle is carried in brackets $H^5$ conveniently made integral with the tubular member $A^3$. At the lower end of the spindle $H^4$ is a pin $A^5$ which constitutes part of the folding arm A and the arm is secured to the lower end of this spindle by a sleeve $A^6$; the arm A is further supported by a tie $A^7$ which is connected to the free end of the arm by a lug $A^8$ and is pivoted at the other end to a sleeve $A^9$ fast on the upper end of the spindle $H^4$.

The spindle $H^4$ is free to turn and also to rise and fall in the brackets $H^5$. The turning movement is given to it by the wheel $H^2$ and as this wheel is constantly reciprocated by the quadrant $G^3$ through the medium of the shaft H, the spindle $H^4$ and consequently the arm A will receive a corresponding backward and forward movement. The vertical movement of the spindle is obtained by a cam member $H^6$ carried by the lower bracket $H^5$. The member is rotatably mounted in the bracket but is prevented from movement in one direction by a spring controlled pawl $H^7$ mounted on the bracket and engaging recesses or teeth $H^8$ in the periphery of the cam member. The member has two cams $H^9$ set at an angle of 180° from each other and a notch $H^8$ is allotted to each cam. Co-operating with the cam member $H^6$ is a converse cam member $H^{10}$ secured to the spindle $H^4$; a spring $H^{11}$ bears at one end against this cam member and at the other end against the underside of the upper bracket $H^5$ so that it always tends to depress the spindle $H^4$. From this it will be seen that as the spindle H⁴ turns in the direction indicated by the arrow (Figs. 1 and 2), the arm A will be carried round to the right of Fig. 1 and the cam member H⁶ will be carried round in the same direction by the converse cam member H¹⁰. When however the spindle H⁴ reaches the limit of its movement in this direction and begins to return the cam member H⁶ will be held by the pawl H⁷ so that the converse cam member H¹⁰ will now rise on the cams H⁹ whereby the spindle H⁴ and consequently the folding arm A will be lifted, against the action of the spring H¹¹. The recesses H⁸ in the periphery of the cam member and the cams H⁹ on the member are so adjusted that the converse cam member H¹⁰ will drop over the vertical faces of the cams H⁹ at the moment when the spindle H⁴ and folding arm A arrive at the limit of the return movement.

The thread or cord J of which the tire fabric is to be built up is drawn, under tension, from a bobbin as hereinafter described and passes round a guide pulley J¹. At the commencement of operations the free end of the cord is secured to one of the pins B¹ on the right hand side of the "former" B (Fig. 1) that pin being selected which is so disposed relatively to the guide pulley J¹ that the cord will lie approximately at the required angle across the "former." In addition to the pin A⁵ the folding arm carries a second pin A¹⁰ and when the cord is in the position described the pin A¹⁰ passes freely over it, as the folding arm rises during its return movement to the position shown in Fig. 1, but when the spindle H⁴ drops as described, the pins A⁵ A¹⁰ are both brought low enough to engage the cord J. The position of the folding arm when this drop occurs is such relatively to the cord that the pin A⁵ lies on one side of the cord while the pin A¹⁰ lies on the other, as clearly shown in Figs. 1, 3 and 4.

The guide pulley J¹ is pivoted on a vertical pin J² carried by an arm J³ which in turn is secured to the tubular upright A³. Pivoted on the same pin J² is a disk J⁴ carrying an arm J⁵ whose free end is provided with a jaw J⁶ to receive a pulley J⁷. The disk J⁴ is controlled by a spring J⁸ secured to a fixed member J⁹ on the arm J³ and the pulley J⁷ is thus made to bear against the cord J. The upper end of the pulley J⁷ is flanged as shown at J¹⁰, and this flange projects over the top of the cord. In the periphery of the disk J⁴ is a notch J¹¹ into which the member J⁹ projects so that the latter constitutes a stop whereby the movement of the disk is restricted.

As the arm A advances toward the "former" it will be seen that a double loop is formed comprising the parts j j¹ j². The part j extends from the pin A⁵ to one of the pins B¹ of the "former," the part j¹ extends from the pin A⁵ to the pin A¹⁰ of the folding arm and the part j² extends from the pin A¹⁰ to the guide pulley J¹. As the arm advances the part j¹ is folded over toward the part j, and the part j² folds back upon the part j¹, whereby a double loop is formed as clearly shown in Fig. 4.

In order that the rest of the operation may be efficiently carried out, it is necessary that this loop or in other words, the part j¹ shall be of predetermined length, as otherwise when the loop is to be transferred to the "former" it will be found that the loop is too short to pass over the pins or it will be too long, with the result that the cords when in place are not sufficiently tight. The pins A⁵ A¹⁰ of the folding arm thus constitute a device whereby portions of the cord J of predetermined length are selected or measured off for the formation of each loop, and as the whole operation is performed with the cord under tension as hereinafter described, each loop is necessarily of the precise length adapted to the "former". The pin A¹⁰ is conveniently adjustable on the folding arm A so that it can be readily set to the length of loop required.

The cords preferably employed are of flattened cross section as described in the British Letters Patent No. 753 of 1903 already referred to, and with cord of this section it is necessary that the flat side shall be turned toward the tread portion of the "former" while at the edges, the cord is turned so that it lies edgewise upon the "former". To obtain this result, the cord is fed over the guide pulley J¹ with its flat side toward the pins A⁵ A¹⁰ and as the loop is formed the pulley J⁷ is carried out by its arm J⁵ under the action of the spring J⁸ so that it bears against the portion j² of the cord and prevents any twisting of the same between the guide pulley J¹ and the pin A¹⁰ of the folding arm. The flange J¹⁰ of the pulley also serves as a guide to maintain the cord at the requisite level as hereinafter more particularly described.

As the folding arm returns to the position shown in Fig. 1 its free end strikes a pin J¹² carried by the pulley arm J⁵ whereby this arm is pushed back and the pulley J⁷ carried backward, allowing the cord to pass behind the pin A⁵ which otherwise it might prevent. In Fig. 1 the folding arm has dropped and has just commenced to move forward so that the pulley arm J⁵ is again released.

On each side of the "former" and projecting slightly above the same are guide members B² which the looped cord bears against as the arm A advances to the limit of its movement. The central portions of the cord as they strike the guides are turned over so that the flat face is brought toward the "former", and immediately the cord leaves the guides, which it does as the arm A arrives at the limit of its movement the presser foot C descends and grips the central portion of the cord firmly upon the "former."

It will be seen that the guides $J^2$ raise the cord above the "former" and consequently above its proper level for the pins $A^5$ $A^{10}$, but the flange $J^{10}$ on the pulley $J^7$ maintains the supply of cord at the desired level.

The mechanism for operating the presser foot is shown more particularly in Fig. 8, and comprises the following elements:—A bell-crank lever $C^1$ is pivoted at $C^2$ to a vertical plate $C^3$ carried by a bracket $C^4$ on the table $A^1$. One arm of the lever $C^1$ is approximately horizontal, and pivoted to its free end is a presser-foot C while the other end is connected to a spring $C^5$ secured to the plate $C^3$ and which always tends to keep the presser-foot down upon the "former". The end of the horizontal arm of the bell-crank lever $C^1$ also carries a lug $C^6$ to which is secured an inclined striking plate $C^7$. The folding arm A carries a striking piece $A^{11}$ pivoted at $A^{12}$ and normally kept in a vertical position by a spring $A^{13}$. By means of this construction, the folding arm, just before it arrives at the limit of its forward movement, raises the striking plate $C^7$ by means of the striking piece $A^{11}$ as it passes beneath it, whereby the bell-crank lever $C^1$ is made to rock in a direction against the tendency of the spring $C^5$ so that the presser-foot C is lifted. As the folding arm arrives at the limit of its movement the striking-piece $A^{11}$ passes beyond the plate $C^7$ so that the presser-foot is re-released and immediately descends under the action of the spring $C^5$. By this time however, the loop carried by the folding arm has been brought to the required position and has been pressed home against the loops already laid, by pivoted presser feet or fingers $A^{14}$ also carried by the folding arm and controlled by springs $A^{15}$. Each finger has a tail portion $A^{16}$ adapted to strike against a stop $A^{17}$. The stops are carried by a forked member $A^{18}$ secured to the plate $C^3$ and the tail portions of the fingers $A^{14}$ come into contact therewith just before the presser-foot C descends so that the fingers are by this means advanced against the action of their springs $A^{15}$, to carry the loop clear of the guides $B^2$ and press it home as already mentioned. The central portion of the loop is thus temporarily held on the "former" by the presser-foot with the flat face of the cord turned toward the surface of the "former" while the ends of the loop are still carried by the pins $A^5$ $A^{10}$ and are presented edgewise to the "former". The object of thus holding the cord on the "former" is to prevent the tension on the supply cord from displacing the loop before it is attached to the pins $B^1$ and further to prevent displacement of the same through any uneven action of the transferring devices hereinafter described.

The transferring devices D, (Figs 1, 5, 6 and 7) now come into operation. One of these devices is situated on each side of the "former", one in close proximity to the pin $A^5$ and the other opposite the pin $A^{10}$ when the folding arm is in the position just described, but that which should appear on the left of the "former" in Fig. 1, is omitted for the sake of clearness.

Each device comprises an arm D mounted rotatably in bearings $D^1$ and carrying at that end remote from the "former" a crank $D^2$. These cranks are connected by links $D^{2*}$ to opposite ends of a cross-head $D^3$ carried by a vertical shaft K. The shaft K is preferably rectangular in cross section and slides freely in bearings $K^1$ (Fig. 15) on one of the frame members $A^2$ of the machine. The shaft is reciprocated by a link $K^2$ which pivotally connects it with a crank pin $K^3$ carried by a disk $K^4$ fast on the driving shaft F.

The operative end of each arm D, that is the end nearest the "former", is bent outwardly, as shown at $d$ and the reciprocation of the vertical shaft K will cause these ends to alternately advance in the arc of a circle toward the pins $B^1$ of the "former" and return in the same path. At the operative end of each arm D is a member $D^4$ from which extend two fingers $D^5$ $D^6$ rigid with the member $D^4$ and between these is pivoted a transferring tumbler or finger $D^7$ having a tripping arm $D^8$. The finger $D^7$ is slotted as shown at $D^9$ (Fig. 6) at the point where the pivot pin $D^{10}$ passes through it, and it is engaged by a spring $D^{11}$ which always tends to maintain the finger at the limit of its forward movement between the fixed fingers $D^5$ $D^6$. Above each transferring device, a cam $D^{12}$ is secured. This may be supported from any convenient fixed part of the machine and is shown in Fig. 1 as carried by an arm $D^{13}$ which is secured to a standard $D^{14}$. When the transferring devices are in the raised position the cam co-operating with each bears against the controlling spring $D^{11}$ so that the transferring finger $D^7$ is withdrawn to the limit of its inward movement between the fixed fingers $D^5$ $D^6$.

The operation of this portion of the machine is as follows:—As soon as the presser-foot C has gripped the newly presented loop, the transferring arms both commence to turn in the direction indicated by the arrows (Fig. 5) which brings the transferring fingers $D^7$ down into the loops of the cord and in line with the pins $A^5$ $A^{10}$. The continued downward movement now brings the fixed fingers $D^5$ $D^6$ down upon the cord so that they push it off the pins $A^5$ $A^{10}$ whereupon it is received by the spring controlled tumblers or fingers $D^7$. The ends of the loop are carried down to the pins $B^1$ and the machine is so adjusted that the transferring fingers coincide with a corresponding pair of pins, one on each side of the "former". Secured to a fixed part of the machine and on each side of the "former" is a stop $D^{15}$ against which the tripping arms $D^8$ of the transferring fingers $D^7$ are brought as the fingers arrive at the pins $B^1$ to which the loop is to be transferred. The forward movement of the transferring fingers is thus stopped, but the fixed fingers $D^5$ $D^6$ continue their advance with the arms D and push the loop off the fingers $D^7$ and on to the pins. The arms D now return and as they arrive again at the starting point the springs $D^{11}$ are brought against the cams $D^{12}$ so that the transferring fingers are withdrawn ready to enter the next loop. The fixed finger $D^6$ of the right hand transferring device (Fig. 5) is shorter than the finger $D^5$ for the purpose of allowing the passage of the pin $A^{10}$ into position opposite the transferring finger $D^7$. The springs $D^{11}$ in addition to advancing the transferring fingers as described, also serve to maintain the tension on the loops, and as the arcs through which the transferring fingers move do not necessarily coincide with the path described by the end of the loop as it is laid on the curved working face of the "former" a yielding device is desirable.

Although in Fig. 1 the cross head $D^3$ is shown for convenience as if it might be rigidly secured to the reciprocating shaft K, it is found in actual practice that if so arranged that transferring device allotted to the pin $A^5$ of the folding arm would in its upward movement foul the cord as this moves in a direction to pass beneath the pin. To obviate this difficulty the cross-head is mounted free on the shaft as shown in Fig. 20, and on the shaft is a collar $K^5$, whereby the cross-head is moved downward, the upward movement being effected by a spring $K^6$. As the cross-head rises, it is brought against stops $K^8$, on a suitable support $K^7$, which limit its upward movement, while the shaft K continues to rise, and the transferring devices are thus brought to rest at the limit of their upward movement before the cord is brought into such position by the folding arm as to foul, whereas if the cross-head were fixed to the shaft K they would have to be so arranged as to arrive at this point later so that fouling, as already described, would take place. The transferring devices remain stationary until the collar $K^5$ again descending strikes the cross-head $D^3$ and carries it down, the cord in the meantime having passed beneath the pin $A^5$ and its transferring device.

During the downward movement of the transferring devices it is desirable to consolidate or displace the loop previously laid so that clearance may be left for the proper placing of the new loop on the next pair of pins. For this purpose a consolidating presser foot or displacer L comprising two claws $L^*$ carried by a rocking arm $L^1$ is employed, one on each side of the "former". Each displacer has what may be called a square movement, that is to say, the claws first advance toward the "former", then move along the face of the same after which they are withdrawn from the "former" and then carried back to the position from which they started. This movement is obtained by the mechanism shown in Figs. 10 to 13.

Each member $L^1$ in addition to being free to rock in its bearings can also slide endwise therein and is controlled by a spring $L^{21}$. Each rocking member $L^1$ has secured to it a vertical arm $L^2$ and these are connected by a spring $L^3$. Free to slide on each rocking member $L^1$ is a sleeve $L^4$ connected by a link $L^5$ with an arm $L^6$ on a rocking shaft $L^7$. This rocking shaft carries an arm $L^8$ which engages a pin $L^9$ on the reciprocating vertical shaft K already referred to. (See Fig. 11).

Pivoted on a rectangular bracket $L^{10}$ are two catches $L^{11}$ controlled by a spring $L^{12}$ and limited in their movement in one direction by two stops $L^{12*}$. Each catch has a shoulder $L^{13}$ at its rear and a beveled face $L^{14}$ at the forward end. Each rocking member $L^1$ carries a co-operating dog $L^{15}$ which is cut away on the underside as shown at $L^{16}$ (Fig. 13) to receive the catch $L^{11}$ and is beveled at the rear as shown at $L^{17}$.

Pivoted at $L^{18}$ to the reciprocating shaft K is a trip $L^{19}$ controlled by a spring $L^{20}$. The trip is so situated that with the parts in the position shown in Fig. 11, it will catch upon the ends of the members $L^{15}$ as the shaft descends and turning about its pivot against the action of its spring will pass below them, but as the shaft rises the trip will rise beneath the projecting ends of the members $L^{15}$ and engage them as hereinafter described.

The operation of this mechanism is as follows—At the commencement of the cycle of operations, the dogs $L^{15}$ lie to the front of the catches $L^{11}$, and when in this position the displacing devices are advanced toward the "former" and have just commenced their movement parallel with the same for the purpose of displacing the cord. At this point the shaft K has commenced to rise and the trip $L^{19}$ is already above the dogs $L^{15}$. The continued upward movement of the shaft K causes a rearward movement of the links $L^5$ and the sleeves $L^4$ thereon being in contact with the arms $L^2$, cause the rocking members $L^1$ to be withdrawn against the action of their springs $L^{21}$ and parallel with the face of the "former", whereby the displacing of the cord last laid on the "former" is effected. During this rearward movement of the rocking members, the dogs $L^{15}$ pass the catches $L^{11}$ by forcing them together against the action of their spring $L^{12}$ as shown in Fig. 10. As the rocking members $L^1$ arrive at the limit of their rearward movement, the dogs pass the shoulders $L^{13}$ on the catches so that these immediately resume their normal position and prevent return movement of the rocking members, as shown in Fig. 11. The shaft K now commences its downward movement and the sleeves $L^4$ slide along the rocking members, which do not now follow them, as they are still held by the catches $L^{11}$. The trip $L^{10}$ now passes beneath the dogs $L^{15}$ and at the commencement of the upward movement of the shaft K it engages the projecting ends of the dogs $L^{15}$ from beneath, and lifts them above the catches $L^{11}$ as shown in Fig. 12. This movement rocks the members $L^1$ so that the displacing claws $L^*$ are carried away from the "former" and release the cord formerly displaced by them, but immediately the dogs are released the rocking members are advanced by the springs $L^{21}$ so that the dogs now ride over the catches as shown in Fig. 13; during this movement the displacing claws are traveling in a path parallel to the face of the "former," but when the dogs slide over the ends of the catches, the spring $L^3$ immediately rocks both of the members $L^1$ in such direction as to bring the displacing claws again into proximity with the face of the "former." The sleeves $L^4$ which have already begun their next rearward movement now again commence to move the rocking members $L^1$ back for the next cycle of operations.

The displacing devices in addition to drawing back the cord previously laid so that it may not foul that about to be laid, serve to consolidate them by packing them closely to each other and moreover these devices may be conveniently employed for rotating the "former."

It will be understood that the folding arm and transferring devices are arranged to operate in one position only, so that it is necessary to rotate the "former" preferably, step by step, for the purpose of bringing a fresh pair of pins $B^1$ into line with the transferring fingers at each operation. These "formers" are already used for building up tires by hand and are described in the British Patent 10942 of 1903 and U. S. Patent 781,687 already referred to. They have a working face of curved cross-section as clearly shown in Fig. 6, the working face being at the top in this figure and extending from the pins $B^1$ on one side to the pins $B^1$ on the other.

For making tires by hand the "former" is usually rotatably mounted on a fixed spindle, but for the purpose of this machine, it is desirable to mount it rotatably on a swinging support such as that shown at $B^3$ (Fig. 15). This member is pivoted to the base of the machine at $B^4$ and when in the operative position shown, its center of gravity lies to the right of the pivot so that it rests against any convenient stop on the frame of the machine and requires no other fastening.

The angle through which the "former" is moved at each operation of the displacing devices is controlled by escapement mechanism shown in position in Fig. 15, and also on an enlarged scale in Fig. 16. The crank disk $K^4$ on the shaft F carries a cam $B^5$ adapted as the disk rotates to strike one end of a rocking lever $B^6$. The other end of this lever is connected by a link $B^7$ to an arm $B^8$ pivoted to one of the supports $A^2$ of the machine. The arm $B^8$ carries an adjusting screw $B^9$ which bears against the free end of an arm $B^{10}$. This arm is pivoted at $B^{11}$ to a member $B^{12}$ pivoted to the frame of the machine at $B^{13}$ and controlled by a spring $B^{14}$. The arm $B^{10}$ carries a pallet-arm $B^{15}$, the pallets of which co-operate with teeth $B^{16}$ on the inner periphery of the "former" B; a spring $B^{17}$ retains the arms $B^{10}$ in contact with the adjusting screw $B^9$, and a spring $B^{18}$ (Fig. 15) connected to the link $B^7$ maintains the operative end of the lever $B^6$ in contact with the disk $K^4$.

The displacing devices tend to rotate the "former" in the direction indicated by the arrow, and at the commencement of their movement to displace the cord, the cam $B^5$ rocks the lever $B^6$ and advances the link $B^7$ against the action of the spring $B^{18}$, so that the adjusting screw $B^9$ moves the escapement arm $B^{10}$ in the direction indicated by the arrow (Fig. 16). This allows the "former" to advance half the distance of one tooth and the "former" instead of being engaged by the pallet on the right of Fig. 16, is now engaged by that on the left. The cam $B^5$, however, immediately releases the rocking lever $B^6$ when the link $B^7$, returning under the action of the spring $B^{18}$, withdraws the tappet screw $B^9$ from the escapement arm $B^{10}$ whereupon this is returned to its former position by the spring $B^{17}$; the "former" then again advances half the distance of a tooth.

The number of teeth on the "former" correspond to the number of pairs of pins $B^1$, and as each operation of the displacing devices carries the "former" round a distance of one tooth, it will be seen that a fresh pair of pins is brought into position at each operation. Although the movement of the "former" is in reality in two steps, as described, it will be readily understood that it is practically one movement and the cord is sufficiently elastic to allow for any lack of synchronism which may be present.

The member $B^{12}$ is not essential to this mechanism, and is only provided in order that if it is desired to turn the "former" by hand the whole escapement may be lifted free of the "former" by turning the member about its pivot against the action of its spring $B^{14}$; the spring normally keeps it down against the stop indicated at $B^{19}$.

It will be seen that the presser-foot C is resting upon the cord on the "former" during the movement of the latter so that it is necessary to allow for a slight rearward movement of the presser-foot. This is rendered possible by the presser-foot being pivoted to the bell-crank lever C¹ as already described and as soon as the presser-foot is lifted preparatory to gripping the next cord, it is swung forward again by a spring C⁸ which is connected to a fixed member C⁹ at one end and to a pin C¹⁰ on the presser-foot at the other end. The fixed member C⁹ is slotted to receive the presser-foot so that it serves as a stop for the same whereby the forward movement of the foot is limited.

The tensioning device is shown in position in Fig. 14 and separately on a larger scale in Figs. 17 to 19.

Two sets of pulleys M, M¹ are supported in frames M², M³ respectively, and the frames are mounted at opposite ends of horizontal arms M⁴. The arms are rigidly secured in a standard M⁵ carried on the base A¹ of the machine and the frames M² M³ are free to slide on the arms. Mounted on each arm between the frames and the central standard are springs M⁶ M⁷ and the springs M⁶ are preferably stronger than the springs M⁷.

At any convenient position and preferably at some distance from the machine a supply bobbin N is mounted. The bobbin is free to turn on a fixed spindle N¹ and the cord, of which the tire is built up, is wound thereon and passed backward and forward round the pulleys M M¹ and carried thence to the guide pulley J⁴ (Fig. 1) already referred to. The base of the bobbin is drum-shaped to provide a braking surface N² and surrounding this is a band brake N³. One end of the brake is rigidly secured to the bobbin support, as shown at N⁴ and the other end is connected to a bell crank lever N⁵ pivoted to the bobbin support at N⁶. The lever has a long and a short arm, and the brake band is connected with the short arm thereof. The long arm is connected by a wire N⁷ to a lug N⁸ (Fig. 17) on the frame M³ of the pulleys M. The bell crank lever N⁵ is controlled by a spring N⁹ which always tends to apply the brake. This tension device provides a considerable reserve of cord under tension from which the folding arm A can instantly select portions of predetermined length for the purpose of forming the loops. When the folding arm draws upon this reserve the frame M³ carrying the pulleys M¹ is first pulled in against the action of the springs M⁷ as these are weaker than the springs M⁶. As the supply of cord however is further drawn upon, the frame M³ also moves in and in doing so pulls the lever N⁵ over against the action of its spring N⁹ whereby the brake N³ is released. The bobbin is now free and allows more cord to be drawn from it on to the pulleys M M¹.

Should the bobbin tend to overrun and thereby feed more cord to the tension device than the latter can maintain at the requisite tension, the springs M⁶ immediately carry the frame M² back in a direction away from the standard M⁵ whereby the bell-crank lever N⁵ is released so that its spring N⁹ immediately pulls it into such position that the brake N³ is applied. The object of this co-operation of the band brake with the tension device is to prevent overrunning of the bobbin and to insure that the cord fed to the folding arm shall always be under uniform tension. By compressing the springs M⁷ before the bobbin is released tension at the start is insured and by preventing overrunning of the bobbin, tension is insured at the finish. Whatever cord or thread is used in the manufacture of these tires it necessarily has a certain amount of elasticity and any variation in the length of the loops is fatal to the production of a perfect tire and in order to obtain the best results all the cords should be exactly equal in length so that each comes under the same degree of tension when the finished tire is inflated.

Although cord has been referred to, mainly, throughout this specification as the substance employed for building up the tire, it will be understood that any kind of thread suitable for the purpose may be used in the same machine, although the rubbered cord of flattened cross section already referred to is preferred.

It will be obvious that the movements of the folding arm, transferring devices, and other parts of this machine may be effected by mechanism other than that described and that the invention is not restricted to such specific mechanisms, which are given by way of example.

Although loops have been referred to throughout the specification, it will be understood that while the cord is laid on the "former" in the shape of loops, these may afterward be cut at the edges if it is not desired to retain them in this form in the completed tire.

The "formers" described in British Patent 10,942 of 1903 and U. S. patent 781,687 referred to are collapsible and are also provided with movable pins, so that after the fabric has been built up, the pins may be withdrawn into the interior of the "former." The loops of the fabric are thus released and the "former" can then be collapsed and the whole fabric thus removed therefrom. It is found in practice however that if the pins for receiving the loops are made short, the loops can afterward be strained over them so that it is not essential to use movable pins.

What I claim as my invention and desire to secure by Letters Patent is:—

1. In a machine for making pneumatic tires, the combination of a "former" having a working face of curved cross-section, and means for laying a cord in zig-zag fashion upon the working face in such manner that the folds constituting one layer lie side by side therein without crossing each other and a fabric is built up corresponding in shape to the finished tire and having loops in the edges on both sides, substantially as set forth.

2. In a machine for making pneumatic tires, the combination of a "former" having a working face of curved cross-section, means for making loops of "cord" and means for laying such loops at the required angle across the "former" whereby a fabric is built up corresponding in shape to the finished tire and having loops in the edges on both sides, substantially as set forth.

3. In a machine for making pneumatic tires the combination of a "former" having a working face of curved cross-section, means for maintaining the "cord" under tension, means for selecting predetermined lengths of the "cord" while under tension, and means for laying such selected lengths of cord upon the working face of the "former" in such manner that a fabric is built up corresponding in shape to the finished tire and having loops in the edges on both sides, substantially as set forth.

4. In a machine for making pneumatic tires the combination of a "former" having a working face of curved cross-section, means for maintaining the cord under tension, means for folding the "cord" into loops of predetermined length while under tension, and means for laying such loops upon the working face of the "former" in such manner that a fabric is built up corresponding in shape to the finished tire and having loops in the edges on both sides, substantially as set forth.

5. In a machine for making pneumatic tires the combination of a "former" having a working face of curved cross-section, means for maintaining the "cord" under tension, means for folding the "cord" into double loops of predetermined length while it is under tension and means for laying such loops upon the working face of the "former" in such manner that a fabric is built up corresponding in shape to the finished tire and having loops in the edges on both sides, substantially as set forth.

6. In a machine for making pneumatic tires the combination of a "former" having a working face of curved cross-section, means for making loops of "cord" of predetermined length and laying them on the "former," means for maintaining tension on the "cord" while the loop is being made and laid on the "former," and means for temporarily holding a part of each loop in position on the "former" while the remainder of the loop is being laid thereon, whereby a fabric is built up corresponding in shape to the finished tire and having loops in the edges on both sides, substantially as set forth.

7. In a machine for making pneumatic tires the combination of a "former" having a working face of curved cross-section and a series of pins on opposite sides thereof, and means for making loops of "cord" of predetermined length and delivering them on to the pins in such manner that a fabric is built up corresponding in shape to the finished tire and having loops in the edges on both sides, substantially as set forth.

8. In a machine for making pneumatic tires, the combination of a "former" having a working face of curved cross-section, means for making loops of "cord," and means for transferring the loops from the loop-forming device and laying them on the "former" whereby a fabric is built up corresponding in shape to the finished tire and having loops in the edges on both sides, substantially as set forth.

9. In a machine for making pneumatic tires the combination of a "former" having a working face of curved cross-section and a series of pins on opposite sides thereof, means for making loops of "cord" of predetermined length, and means for transferring the loops from the loop-forming device and delivering them to the pins of the former whereby a fabric is built up corresponding in shape to the finished tire and having loops in the edges on both sides, substantially as set forth.

10. In a machine for making pneumatic tires, the combination of a "former" having a working face of curved cross-section, means for supplying "cord" under tension to the "former" a guide ($J^1$) from which the "cord" passes to the "former" so that a portion of such "cord" is normally extended between the "former" and guide, two folding-pins ($A^5$ $A^{10}$), means for supporting these pins and maintaining them at a distance apart equal to the predetermined length of the folded loops of "cord" to be applied to the "former," means for adjusting the relative positions of the pins and cord so that one pin is brought to one side of the extended portion of the "cord" and the other to the opposite side of the same and then moving one relatively to the other in such manner that a double fold or loop of the "cord" is obtained, and means for delivering the loops so folded to the "former," whereby a fabric is built up corresponding in shape to the finished tire and having loops in the edges on both sides, substantially as set forth.

11. In a machine for making pneumatic tires, the combination of a "former" having a working face of curved cross-section, means for supplying "cord" under tension to the "former" a guide ($J^1$) from which the "cord" passes to the "former" so that a portion of such "cord" is normally extended between the "former" and guide, two folding-pins ($A^5$ $A^{10}$), means for moving one pin ($A^{10}$) back and forth in a circular path about the other ($A^5$) for the purpose of folding the "cord" into loops the central pin being situated on that side of the extended portion of the "cord" which faces in the direction of movement of the second pin ($A^{10}$) which lies on the opposite side of the "cord," backwardly and forwardly moving transferring devices to receive the folded loops from the pins ($A^5 A^{10}$) one of such devices being situated, when at the limit of its movement in one direction, in proximity to the pin ($A^5$), a movable guide for the extended cord portion ($J^7$), means for moving this guide to deflect the extended portion of cord so that it lies clear of the path of the transferring device allotted to the central pin ($A^5$) as the transferring device approaches the pin, means for returning the guide to such position that the "cord" can pass the transferring device after this has returned, means for moving the pins so that they may not foul the "cord" while the pins and "cord" are being brought into proper relative position, and means for replacing them to engage the cord preparatory to forming a loop, whereby a fabric is built up corresponding in shape to the finished tire and having loops in the edges on both sides, substantially as set forth.

12. In a machine for making pneumatic tires, the combination of a "former" having a working face of curved cross-section, means for supplying "cord" under tension to the "former," a guide ($J^1$) from which the "cord" passes to the "former" so that a portion of such "cord" is normally extended between the "former" and guide in a plane approximately at right angles to that occupied by the "former," a folding-pin ($A^5$) vertical to such plane and situated between the extended "cord" and the "former" so that the "cord" may fold round it as it is advanced to the "former," a second folding-pin ($A^{10}$) parallel to the first, means for maintaining this second pin at a distance from the other equal to the predetermined length of the folded loops of "cord" and for moving it to and from the "former" in a path having the first pin for its center the limit of its travel, in a direction away from the "former," being such that the pin can be brought to that side of the extended "cord" remote from the "former" and not occupied by the first pin, means for moving both pins vertically out of the plane of the "cord" as the second pin travels from the "former" and for returning them to the same plane to engage the "cord" as it reaches the limit of its movement in this direction, and means for delivering the loops, formed on the pins, to the "former," whereby a fabric is built up corresponding in shape to the finished tire and having loops in the edges on both sides, substantially as set forth.

13. In a machine for making pneumatic tires, the combination of a "former" having a working face of curved cross-section, means for supplying "cord" under tension to the "former," a guide ($J^1$) from which the "cord" passes to the "former" so that a portion of such "cord" is normally extended between the "former" and guide in a plane approximately at right angles to that occupied by the "former," a folding-arm extending in a plane parallel to that occupied by the extended "cord," vertical pins ($A^5 A^{10}$) carried by the folding arm and set at a distance apart equal to the predetermined length of the folded loops of "cord," means for swinging the arm toward and away from the "former" about a center co-axial with one of the pins so that the pins, at the limit of its movement in one direction, lie each on opposite sides of the extended "cord" and at the limit of its movement in the other direction lie on opposite sides of the "former," means for moving the folding arm vertically out of the plane of the "cord" as it moves from the "former" so that the pins and "cord" can cross each other until the arm reaches the limit of its backward movement when it is again moved into the plane and the pins engage the extended "cord" on opposite sides, and transferring devices to receive the loops from the pins and deliver them on to the "former," in such manner that a fabric is built up corresponding in shape to the finished tire and having loops in the edges on both sides, substantially as set forth.

14. In a machine for making pneumatic tires the combination with a "former" having a working face of curved cross-section and a series of pins on opposite sides thereof, means for making loops of "cord" of predetermined length, pins ($A^5 A^{10}$) to support such loops so that they are presented to the "former" at the required angle, transferring devices situated one on each side of the "former" and having a finger adapted to enter the loops and a lug adapted to push the loops off the supporting pins, means for moving the transferring devices backward and forward between the loop-pins and the "former"-pins so that as they move in one direction they carry the ends of the loops with them and deliver them to the former pins, whereby a fabric is built up corresponding in shape to the finished tire and having loops in the edges on both sides substantially as set forth.

15. In a machine for making pneumatic tires the combination with a "former" having a working face of curved cross-section and a series of pins on opposite sides thereof, means for making loops of "cord" of predetermined length, pins ($A^5 A^{10}$) to support such loops so that they are presented to the "former" at the required angle, transferring devices situated one on each side of the "former" and each having a finger adapted to enter the loops and a lug adapted to push the loops off the supporting pins, means for moving the transferring devices backward and forward between the loop-pins and the "former"-pins so that as they move in one direction they carry the ends of the loops with them and present them to the "former"-pins, and means for withdrawing the transferring fingers from the loops as the latter are delivered on to the pins of the "former," whereby a fabric is built up corresponding in shape to the finished tire and having loops in the edges on both sides substantially as set forth.

16. In a machine for making pneumatic tires, the combination with a "former" having a working face of curved cross-section and a series of pins on opposite sides thereof, means for making loops of "cord" of predetermined length, pins ($A^5$ $A^{10}$) to support such loops so that they are presented to the "former" at the required angle, transferring devices situated one on each side of the "former" and having a pivoted finger adapted to enter the loops and a lug adapted to push the loops off the supporting-pins, the pivoted finger normally extending below the lug to receive the loop, means for moving the transferring devices backward and forward between the loop-pins and the "former"-pins, so that as they move in one direction they carry the ends of the loops with them and present them to the "former"-pins, and means for tripping the pivoted fingers of the transferring devices as the ends of the loops arrive opposite the "former"-pins whereby the fingers are withdrawn behind the lugs as the loops are pushed on to the "former"-pins, so that a fabric is built up corresponding in shape to the finished tire and having loops in the edges on both sides, substantially as set forth.

17. In a machine for making pneumatic tires the combination with a "former" having a working face of curved cross-section and a series of pins on opposite sides thereof, means for making loops of "cord" of predetermined length, pins ($A^5$ $A^{10}$) to support such loops so that they are presented to the "former" at the required angle, transferring devices for the loops situated one on each side of the "former" and having a finger adapted to enter the loops and a lug adapted to push the loops off the supporting-pins, means for moving the transferring devices backward and forward in paths coincident with those described by the ends of the loops as they are laid on the working face of the "former" so that as the transferring devices move in one direction they carry the ends of the loops with them and maintain them under approximately uniform tension while delivering them to the "former"-pins, whereby a fabric is built up corresponding in shape to the finished tire and having loops in the edges on both sides, substantially as set forth.

18. In a machine for making pneumatic tires the combination with a "former" having a working face of curved cross-section and a series of pins on opposite sides thereof, means for making loops of "cord" of predetermined length, pins ($A^5$ $A^{10}$) to support such loops so that they are presented to the "former" at the required angle, transferring devices situated one on each side of the "former" and having a pivoted and sliding finger adapted to enter the loops and a lug adapted to push the loops off the supporting pins, the pivoted finger normally extending below the lug to receive the loop, a spring controlling each finger and tending always to slide it in a direction away from the "former," means for moving the transferring devices backward and forward in paths coincident with those described by the ends of the loops as they are laid on the working face of the "former" so that with the aid of the springs the loops are maintained under approximately uniform tension while being delivered to the "former"-pins, whereby a fabric is built up corresponding in shape to the finished tire and having loops in the edges on both sides, substantially as set forth.

19. In a machine for making pneumatic tires the combination of a "former" having a working face of curved cross-section and a series of pins on opposite sides thereof, means for making loops of "cord" of predetermined length and laying them on the "former," means for maintaining tension on the "cord" while the loop is being made and laid on the "former," and means for temporarily holding the central portion of each loop in position on the "former" while the ends are being delivered on to the pins of the "former," whereby a fabric is built up corresponding in shape to the finished tire and having loops in the edges on both sides, substantially as set forth.

20. In a machine for making pneumatic tires the combination of a "former" having a working face of curved cross-section and a series of pins on opposite sides thereof, means for making loops of "cord" of predetermined length and laying them on the "former," means for maintaining tension on the "cord" while the loop is being made and laid on the "former," and a presser-foot (C) for temporarily holding the central portion of each loop in position on the "former" while the ends are being delivered on to the pins of the "former," whereby a fabric is built up corresponding in shape to the finished tire and having loops in the edges on both sides, substantially as set forth.

21. In a machine for making pneumatic tires the combination of a "former" having a working face of curved cross-section and a series of pins on opposite sides thereof, means for making loops of "cord" of predetermined length and laying them on the "former," means for maintaining tension on the "cord" while the loop is being made and laid on the "former," a presser-foot (C) for temporarily holding the central portion of each loop in position on the "former" while the ends are being delivered on to the pins of the "former," and means operatively connecting the presser-foot with the mechanism for bringing the loops into position on the "former" so that as each loop is brought into position the presser-foot is moved to grip it, whereby a fabric is built up corresponding in shape to the finished tire and having loops in the edges on both sides, substantially as set forth.

22. In a machine for making pneumatic tires of flattened "cord" the combination with a "former" having a working face of curved cross-section of means for making loops of the "cord" and laying them on the working face of the "former," in such manner that the flattened "cord" constituting the end portions of each loop lies approximately edgewise relatively to the working face of the "former," while that constituting the central portion of each loop lies with the flattened face approximately parallel with the working face of the "former," whereby a fabric is built up corresponding in shape to the finished tire and having loops in the edges on both sides, substantially as set forth.

23. In a machine for making pneumatic tires of flattened "cord," the combination of a "former," two folding-pins ($A^5$ $A^{10}$), means for supporting these pins at a given distance apart, means for folding the flattened "cord" in loops upon the folding-pins so that the flattened face of the "cord" lies against the pins both pins being in the same plane, means for presenting the pins to the "former" in such manner that the loop thereon is presented at the required angle across the "former" and with the "cord" edgewise relatively to the working face thereof, a guide above the "former" whereby the central portion of the loop is turned as it is presented so that the flat face of the "cord" at this part lies toward the working face of the "former," and means for transferring the ends of the loops from the pins and securing them to the sides of the "former" without turning them from their edgewise position, whereby a fabric is built up corresponding in shape to the finished tire and having loops in the edges on both sides, substantially as set forth.

24. In a machine for making pneumatic tires of flattened "cord," the combination of a "former," two folding-pins ($A^5$ $A^{10}$), means for supporting these pins at a given distance apart, means for folding the flattened "cord" in loops upon the folding-pins so that the flattened face of the "cord" lies against the pins both pins being in the same plane, means for presenting the pins to the "former" in such manner that the loop thereon is presented at the required angle across the "former" and with the "cord" edgewise relatively to the working face thereof, a guide above the "former" whereby the central portion of the loop is turned as it is presented so that the flat face of the "cord" at this part lies toward the working face of the "former," means for securing this central portion of the loop to the "former" while in this position, and means for transferring the ends of the loops from the pins and securing them to the sides of the "former" without turning them from their edgewise position, whereby a fabric is built up corresponding in shape to the finished tire and having loops in the edges on both sides, substantially as set forth.

25. In a machine for making pneumatic tires of flattened "cord," the combination of a "former" having a working face of curved cross-section and a series of pins on opposite sides thereof, two folding-pins ($A^5$ $A^{10}$), means for supporting these pins at a given distance apart, means for folding the flattened "cord" in loops upon the folding-pins so that the flattened face of the "cord" lies against the pins, both pins being in the same plane, means for presenting the pins to the "former" in such manner that the loop thereon is presented at the required angle across the "former" and with the cord edgewise relatively to the working face thereof, a guide above the "former" whereby the central portion of the loop is turned as it is presented so that the flat face of the "cord" at this part lies toward the working face of the "former," and means for transferring the ends of the loops from the folding-pins on to the pins on the sides of the "former," whereby they are secured to the "former" and maintained in their edgewise position, substantially as set forth.

26. In a machine for making pneumatic tires the combination of a "former" having a working face of curved cross-section, means for making loops of "cord" and laying them at the required angle across the "former" whereby a fabric is built up corresponding in shape to the finished tire and having loops in the edges on both sides, a member for pressing home the loop last laid against those previously laid, and means operatively connecting such member with the means for laying the "cord" on the "former" so that the "cord" is thrust home as it is brought into position, substantially as set forth.

27. In a machine for making pneumatic tires the combination of a "former" having a working face of curved cross-section means for making loops of "cord" and laying them at the required angle across the "former" whereby a fabric is built up corresponding in shape to the finished tire and having loops in the edges on both sides, a member for pressing home the loop last laid against those previously laid, means operatively connecting such member with the means for laying the "cord" on the "former" so that the "cord" is thrust home as it is brought into position, a presser-foot to hold the "cord" upon the "former" when in position, and means for operatively connecting the presser-foot with the mechanism for laying the "cord," so that the presser-foot is brought into operation after the "cord" has been brought into position and pressed home by the member referred to, substantially as set forth.

28. In a machine for making pneumatic tires, the combination of a "former" having a working face of curved cross-section, two folding-pins ($A^5$ $A^{10}$), means for supporting these pins at a given distance apart, means for folding the "cord" in loops upon the folding-pins, means for presenting the loop which is extended between the pins to the "former" and then laying it upon the same, a guide above the "former" and over which the loop passes so that it is raised above the level of the "former" such guide extending to the point where the "cord" is to be laid, a member situated behind the loop, and means for advancing such member as the loop is presented so that it pushes the loop from the guide and over the end thereof and presses it against those already laid on the "former," whereby a fabric is built up corresponding in shape to the finished tire and having loops in the edges on both sides, substantially as set forth.

29. In a machine for making pneumatic tires the combination of a "former" having a working face of curved cross-section, a pivoted arm upon which the "cord" is folded into loops and presented to the "former," a guide between the arm and the "former" which raises the central portion of the loop above the level of the "former" as the loop advances, a presser arm pivoted to the folding arm and depending therefrom to engage the rear of the loop but having an extension on the further side of its pivot, a fixed stop against which such extension is brought when the folding arm approaches the limit of its movement whereby the presser arm is swung forward and pushes the loop from the guide and against those previously laid on the "former," and means for laying the loop thus presented to the "former" upon the working face thereof whereby a fabric is built up corresponding in shape to the finished tire and having loops in the edges on both sides, substantially as set forth.

30. In a machine for making pneumatic tires the combination of a "former" having a working face of curved cross-section, means for laying a "cord" upon the working face in such manner that a fabric is built up corresponding in shape to the finished tire and having a series of "cords" side by side disposed transversely relatively to the tire, and means whereby each transverse portion of "cord" last laid upon the "former" is drawn back while the next is laid thereon, substantially as set forth.

31. In a machine for making pneumatic tires the combination of a "former" having a working face of curved cross-section, means for laying a "cord" upon the working face in such manner that a fabric is built up corresponding in shape to the finished tire and having a series of "cords" side by side disposed transversely relatively to the tire, means whereby each transverse portion of "cord" last laid upon the "former" is drawn back while the next is being laid thereon, and means whereby the "former" is rotated automatically while the "cords" are laid thereon, substantially as set forth.

32. In a machine for making pneumatic tires the combination of a "former" having a working face of curved cross-section and a series of pins on opposite sides thereof, means for making loops of cord and delivering them on to the pins in such manner that a fabric is built up corresponding in shape to the finished tire and having a series of "cords" side by side disposed transversely relatively to the tire, a displacing device ($L^*$) adapted to engage the loop last laid on the "former" at a point near the pins, means for moving the displacing device into proximity to the "former" and in advance of the loop so that movement in a direction toward the "former" and parallel with it will cause the loop to be engaged and pushed back, means for advancing the displacing device to thus push the loop back, means for then carrying the displacing device out of the plane of the loops, and means for returning the device to a position ready for advance again toward the "former," substantially as set forth.

33. In a machine for making pneumatic tires the combination of a "former" having a working face of curved cross-section and a series of pins on opposite sides thereof, means for making loops of "cord" and delivering them on to the pins, in such manner that a fabric is built up corresponding in shape to the finished tire and having a series of "cords" side by side disposed transversely relatively to the tire, a displacing device ($L^*$) adapted to engage the loop last laid on the "former" at a point near the pins and situated in the same plane as the loops, a spring tending normally to maintain this device clear of the loops on the "former," means for advancing the displacing device against the action of its spring so that it is moved parallel with the "former" and engages and pushes back the loop last laid, means for releasing the displacing device from its advancing mechanism, and carrying it out of the plane in which the loops lie so that it is returned by its spring in a different plane, and a guide whereby it is brought again into its normal path as it reaches the limit of its return movement, substantially as set forth.

34. In a machine for making pneumatic tires the combination of a rotatable "former" having a working face of curved cross-section and a series of pins on opposite sides thereof, means for making loops of "cord" and delivering them on to the pins in such manner that a fabric is built up corresponding in shape to the finished tire and having a series of cords side by side and disposed transversely relatively to the tire, a displacing device (L*) adapted to engage each loop last laid on the "former" at a point near the pins, means for moving the displacing device into proximity to the "former" and in advance of the loops so that movement in a direction toward the loops and parallel to the "former" will cause the last loop to be pushed back, means for advancing the displacing device to thus push the loop back, means for returning the device to its original position, and means for rotating the "former," substantially as set forth.

35. In a machine for making pneumatic tires the combination of a rotatable "former" having a working face of curved cross-section and a series of pins on opposite sides thereof, means for making loops of "cord" and delivering them on to the pins, in such manner that a fabric is built up corresponding in shape to the finished tire and having a series of "cords" side by side and disposed transversely relatively to the tire, a displacing device (L*) adapted to engage each loop last laid on the "former" at a point near the pins, means for moving the displacing device into proximity to the "former" and in advance of the loop so that movement in a direction toward the loops and parallel to the "former" will cause the last loop to be pushed back, means for advancing the displacing device to thus push the loop back, means for returning the device to its original position, and means for rotating the "former" step by step, through such an angle as is required to bring one pair of pins thereon into the position formerly occupied by the preceding pair, substantially as set forth.

36. In a machine for making pneumatic tires the combination of a rotatable "former" having a working face of curved cross-section and a series of pins on opposite sides thereof, means for making loops of cord and delivering them on to the pins in such manner that a fabric is built up corresponding in shape to the finished tire and having a series of "cords" side by side and disposed transversely relatively to the tire, a displacing device (L*) adapted to engage each loop last laid on the "former" at a point near the pins, means for moving the displacing device into proximity to the "former" and in advance of the loop so that movement in a direction toward the loops and parallel to the "former" will cause the last loop to be pushed back, means for advancing the displacing device to thus push the loop back, means for returning the device to its original position, and means for controlling the movement of the "former" so that it is permitted to rotate step by step under the action of the displacing device while the latter is pushing back the "cord" last laid thereon such limited movement of the "former" being equal to that required for the purpose of moving one pair of pins thereon into the position occupied by the previous pair of pins, substantially as set forth.

37. In a machine for making pneumatic tires the combination of a rotatably mounted "former" having a working face of curved cross-section, means for laying a "cord" upon the working face in such manner that a fabric is built up corresponding in shape to the finished tire and having a series of "cords" side by side disposed transversely relatively to the tire, means whereby each transverse portion of "cord" last laid upon the "former" is drawn back while the next is laid thereon, such drawing-back causing the "former" to also rotate, and means for limiting the degree of rotation at each operation, substantially as set forth.

In testimony whereof we have signed our names to this specification in the presence of two subscribing witnesses.

THOMAS SLOPER.
ROBERT SLOPER.

Witnesses:
W. H. DERRIMAN,
A. M. HAYWARD.